(12) United States Patent
Hashimoto et al.

(10) Patent No.: US 7,460,190 B2
(45) Date of Patent: Dec. 2, 2008

(54) LCD DEVICE INCLUDING A TFT FOR REDUCING LEAKAGE CURRENT

(75) Inventors: Yoshiaki Hashimoto, Kanagawa (JP); Shigeru Kimura, Kanagawa (JP); Seiji Suzuki, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 129 days.

(21) Appl. No.: 10/923,432

(22) Filed: Aug. 20, 2004

(65) Prior Publication Data

US 2005/0041169 A1    Feb. 24, 2005

(30) Foreign Application Priority Data

Aug. 21, 2003    (JP)    ............... 2003-297575

(51) Int. Cl.
*G02F 1/136* (2006.01)

(52) U.S. Cl. ............... 349/43; 349/42; 349/44

(58) Field of Classification Search ............. 349/41–43, 349/187
See application file for complete search history.

(56) References Cited

U.S. PATENT DOCUMENTS 5,563,432 A * 10/1996 Miura et al. ............... 257/291
5,610,737 A * 3/1997 Akiyama et al. ............. 349/47

FOREIGN PATENT DOCUMENTS

| GB | 2 283 127 | 4/1995 |
|---|---|---|
| JP | 02-216870 | 8/1990 |
| JP | 07-122754 | 5/1995 |
| JP | 10-232409 | 9/1998 |
| JP | 2001-324725 | 11/2001 |
| JP | 2002-141512 | 5/2002 |
| JP | 2002-261423 | 9/2002 |
| JP | 2003-068755 | 3/2003 |
| KR | 2001-0005298 | 1/2001 |

* cited by examiner

*Primary Examiner*—Mike Qi
(74) *Attorney, Agent, or Firm*—Hayes Soloway P.C.

(57) ABSTRACT

An amorphous-silicon TFT (thin-film-transistor) in an LCD device has a larger channel length at both the edge portions of the channel of the TFT compared to the central portion of the channel by forming chamfers at the corners of the source and drain electrodes. The larger channel length at both the edge portions reduces the leakage current caused by the turned-around light incident onto the channel.

21 Claims, 16 Drawing Sheets

US 7,460,190 B2

LCD DEVICE INCLUDING A TFT FOR REDUCING LEAKAGE CURRENT

FIELD OF INVENTION

The present invention relates to an LCD device including a thin-film-transistor (TFT) and, more particularly, to the structure of the TFT used in the LCD device. The present invention also relates to a method for manufacturing a TFT in an LCD device.

BACKGROUND TECHNOLOGY

Active-matrix LCD devices including active elements such as TFTs as switching devices have been increasingly used. Materials used for the semiconductor layers of the TFTs in the LCD device include polysilicon (p-Si) and amorphous silicon (a-Si), for example. A TFT having a polysilicon layer is herein referred to as a p-Si TFT whereas a TFT having an amorphous silicon layer is herein referred to as an a-Si TFT. Comparing both the TFTs against each other, the a-Si TFT has advantages of a smaller number of fabrication steps and allowing lower-temperature fabrication steps.

FIG. 13 shows the sectional view of an LCD panel in a general LCD device, wherein a-Si TFTs 230 are fabricated. The LCD panel 200 includes a TFT substrate 202, a counter substrate 204, and an LC layer 203 sandwiched therebetween. Each substrate 202 or 204 includes an orientation film 207 between the same and the LC layer 203. A backlight unit 206 is disposed at the rear side (bottom side) of the TFT substrate 202 with an intervention of a polarizing plate 201, for irradiating the LCD panel 200 through the polarizing plate 201. Another polarizing plate 205 is disposed at the front side (top side) of the counter substrate 204. The polarizing plates 201 and 205 have respective polarizing axes which are perpendicular to each other.

FIG. 14 shows the top plan view of a portion of the TFT substrate 202 shown in FIG. 13, as viewed from the counter substrate 205. The TFT substrate 202 includes thereon a plurality of signal lines 231, a plurality of scanning lines 232 extending perpendicular to the signal lines 231, and a plurality of TFTs 230 each formed in the vicinity of the intersection between one of the signal lines 231 and one of the scanning lines 232 for driving a pixel electrode 229. Each TFT 230 has a drain electrode 225 extending from a corresponding signal line 231, a source electrode 226 connected to the pixel electrode 229, and a gate electrode 222 extending from a corresponding scanning line 232.

FIG. 15 shows one of the TFTs 230 shown in FIG. 14 in a sectional view taken along line XV-XV in FIG. 14. The TFT shown in FIG. 15 can be fabricated by a known technique such as described in JP Patent Publication 3152193.

In general, the p-Si TFT has a coplanar structure wherein the gate electrode, source electrode and drain electrode are formed on one of both the surfaces of the polysilicon layer, whereas the a-Si TFT has a staggered structure wherein the gate electrode 22 opposes the source electrode and drain electrode with an intervention of the a-Si layer 234, as shown in FIG. 15. The staggered structure shown in FIG. 15 is referred to as an inverted staggered structure due to the gate electrode 222 being disposed at the bottom side of the a-Si layer 234. If the gate electrode is disposed at the top side of the a-Si layer instead, the staggered structure will be referred to as a non-inverted staggered structure.

The drain electrode 225 is in contact with the a-Si layer 224 via an ohmic contact layer 233a, whereas the source electrode 226 is in contact with the a-Si layer 224 via an ohmic contact layer 233b. The source electrode 226 is connected to the pixel electrode 229 via a through hole 228. The TFT 230 shown in FIG. 15 is generally called channel-etched TFT. It is to be noted that the drain electrode 225 has a planar size equal to the planar size of the underlying ohmic contact layer 233a, whereas the source electrode 226 ha a planar size equal to the planar size of the underlying ohmic contact layer 233b.

The a-Si layer 224 in the TFT 230 includes a channel region 234 which overlies the gate electrode 222 and extends from the inner edge of the ohmic contact 233a underlying the drain electrode 225 to the inner edge of the ohmic contact 233b underlying the source electrode 226. The length of the channel region 234 is "L" as shown in the figure. In the TFT 230 of the inverted staggered structure, the gate electrode 222 acts as a light shield film, which shields the channel region 234 against the light emitted from the backlight unit 206.

FIG. 16 shows an enlarged top plan view of the TFT 230. Each of the drain electrode 225 and source electrode 226 has an inner edge opposing the edge of the other of the drain electrode 225 and source electrode 226 with an intervention of the channel region 234. The channel length "L" between the drain electrode 225 and the source electrode 226 is constant independently of the widthwise position of the channel region 234, as shown in FIG. 16.

FIG. 17 shows a top plan view of a portion of the counter substrate 204 opposing the portion of the TFT substrate 202 shown in FIG. 14. As understood from FIGS. 14 and 17, the counter substrate 204 includes a black matrix 242 having a pattern overlapping the TFT 230, signal line 231 and scanning line 232 on the TFT substrate 202, as viewed in the direction of the transmission of the backlight. More specifically, the black matrix 242 shields the TFT 230 etc. against the light from the backlight unit 206, and passes part of the light to thereby define effective pixel areas, or light transmission areas 245. The intensity of the light transmitted through each light transmission area 245 is controlled by the voltage applied through a corresponding TFT 230 between a corresponding pixel electrode 229 and the counter electrode 244 (FIG. 13) on the counter substrate 204. Each light transmission area 255 is provided with a R, G or B coloring layer 243 to display a color image on the screen of the LCD panel.

Although the black matrix 242 is made from a material having a lower reflectance, part of the light incident onto the counter substrate 204 from the backlight unit 206 is reflected by the black matrix 242 to return to the TFT substrate 202. Some of the part of light returned to the TFT substrate 202 is reflected for a multiple of times by the gate electrode 222 and the drain electrode 225 or source electrode 226, to enter the channel region 234 of the TFT 230, especially in a larger amount into both the edge portions of the channel region 234. The light incident onto the channel region 234 causes leakage current across the channel region 234 to degrade the switching characteristic of the TFT 230, whereby the LCD device suffers from degradation of the image is quality.

For prevention of the leakage current caused by the light incident onto the channel region 234, a technique is known wherein the black matrix 242 and the coloring layer 243 are formed on the TFT substrate 202 instead of forming the same on the counter substrate 204. In this technique, reduction of the distance between the black matrix 242 and the TFT 230 allows the light incident onto the channel region 234 to be reduced, thereby reducing the leakage current in the TFT 230. However, this technique involves a problem in that TFTs 230, black matrix 242 and coloring layers 243 must be consecutively formed on the TFT substrate 202, which is difficult to achieve.

The channel region 234 of the TFT is also subjected to the incident light from the backlight unit 206 through the rear side of the TFT substrate 202, in addition to the reflected light from the black matrix 242 as described above. This is because the gate electrode 222 cannot completely shield the channel region 234 against the incident light. In particular, one of the edge portions of the channel region 234 in the vicinity of the pixel electrode 229 is subject to a larger amount of light compared to the other of the edge portions of the channel region 234 in the vicinity of the scanning line 232 because the scanning line 232 extends apart from the channel region 234. This causes a larger leakage current in the vicinity of the one of the edge portions of the channel region 234. It is to be noted that the gate electrode 222 has an extended portion in the vicinity of the pixel electrode 229 for prevention of the incident light, as will be understood from the length "d" of the extended portion of the gate electrode 222 shown in FIG. 16.

The extended portion of the gate electrode 222, however, reduces the light transmission area 255 of the pixel to degrade the brightness or luminance of the pixel because the extended portion enlarges the TFT area and thus the blocking area of the black matrix 242 which shields the TFT area against the incident light.

SUMMARY OF THE INVENTION

In view of the above problem in the conventional LCD device, it is an object of the present invention to provide an LCD device which is capable of reducing the leakage current of the TFT in the LCD device while suppressing the increase of the TFT area.

The present invention provides an LCD device including a TFT substrate mounting thereon a plurality of TFTs, a counter substrate mounting thereon a black matrix, a liquid crystal layer sandwiched between the TFT substrate and the counter substrate, and a backlight unit disposed at a rear side of the TFT substrate for irradiating the TFT substrate with backlight, each of the TFTs having a channel in a semiconductor layer, the channel having a channel length larger at an edge portion of the channel than at a central portion thereof.

The present invention also provides a method for fabricating a TFT in an LCD device, including the steps of: consecutively forming a gate electrode, a gate insulation film, a semiconductor layer and an ohmic contact layer of the TFT; patterning said ohmic contact layer and said semiconductor layer; forming a source electrode and a drain electrode of the TFT on said patterned ohmic contact layer; and etching a portion of said patterned ohmic contact layer between said source electrode and said drain electrode by using said source electrode and said drain electrode as a mask to thereby expose a portion of said semiconductor layer as a channel, said channel having a channel length larger at an edge portion of said channel than at a central portion thereof.

The present invention also provides another method for fabricating a TFT in an LCD device, including the steps of: consecutively forming a gate electrode, a gate insulation film, a semiconductor layer and an ohmic contact layer of the TFT and a metallic film; forming a photoresist film on said metallic film and exposing said photoresist film to exposure light having a specific wavelength through a photomask having a source electrode pattern, a drain electrode pattern and an intermediate pattern sandwiched between said source electrode pattern and said drain electrode pattern, said intermediate pattern having a width smaller than a limit of a resolution by said exposure light, to thereby form a photoresist mask pattern having a thickness larger at a region corresponding to said source and drain electrode patterns than at a region corresponding to a gap between said source electrode pattern and said drain electrode pattern; patterning said metallic film, said ohmic contact layer and said semiconductor layer by using said photoresist mask pattern as a mask; removing said photoresist mask pattern to leave a portion of said photoresist mask pattern having a specific thickness; patterning said metallic film by using said portion of said photoresist mask pattern to form a source electrode and a drain electrode of the TFT; and etching a portion of said patterned ohmic contact layer between said source electrode and said drain electrode by using said source electrode and said drain electrode as a mask to thereby expose a portion of said semiconductor layer as a channel, said channel having a channel length larger at an edge portion of said channel than at a central portion thereof.

In accordance with the LCD device of the present invention and the LCD device manufactured by the method of the present invention, the larger channel length at the edge portion of the channel suppresses the leakage current of the TFT caused by a possible larger amount of backlight incident onto the edge portion of the channel, thereby improving the switching characteristic of the TFT and thus the image quality of the LCD device.

The another method of the present invention achieves a smaller number of photolithographic steps due to provision of the intermediate pattern having a width smaller than the limit of the resolution by the exposure light.

The above and other objects, features and advantages of the present invention will be more apparent from the following description, referring to the accompanying drawings.

PREFERRED EMBODIMENTS OF THE INVENTION

Figure 1:
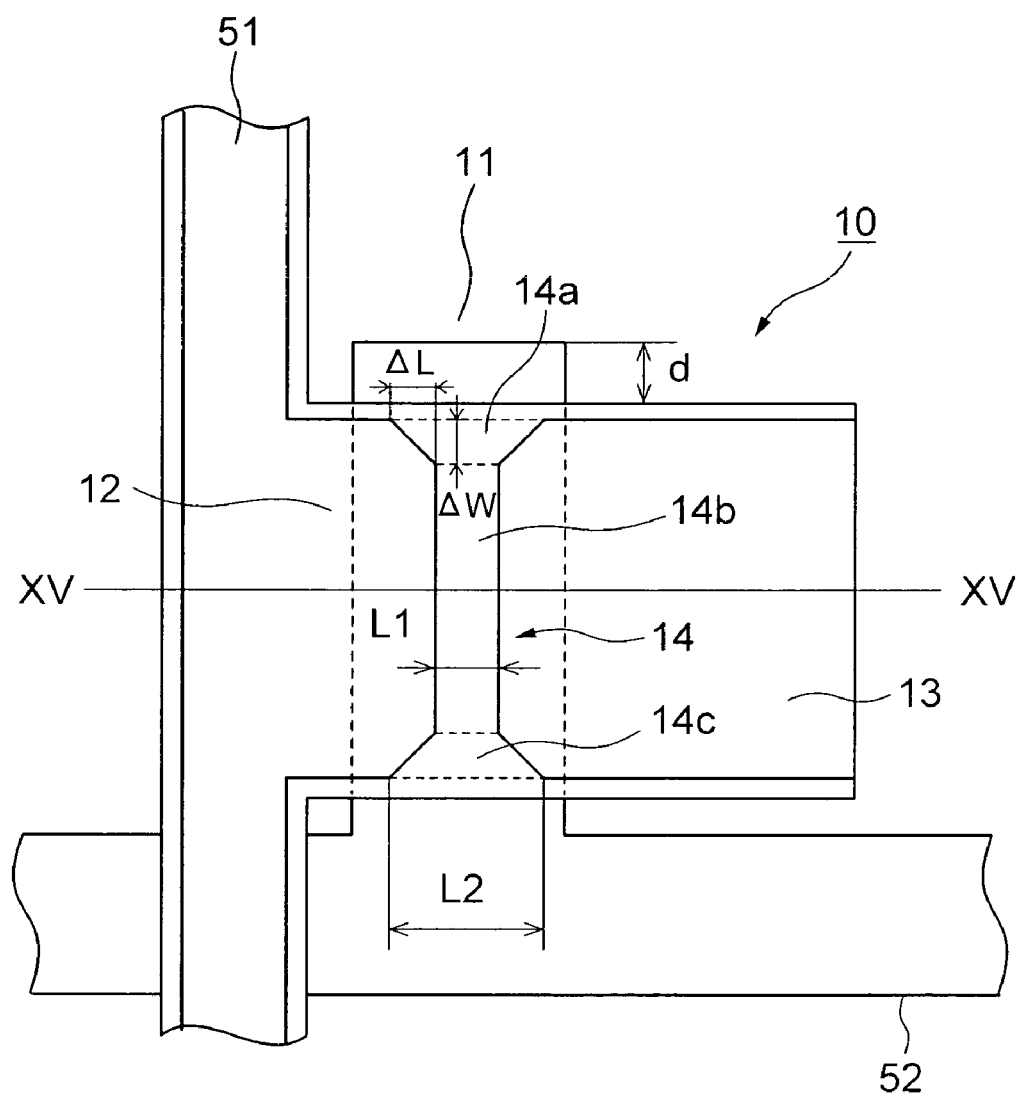
FIG. 1 is a top plan view of a TFT on a TFT substrate in an LCD device according to a first embodiment of the present invention.

Now, the present invention is more specifically described with reference to accompanying drawings, wherein similar constituent elements are designated by similar reference numerals.

FIG. 1 shows a TFT generally designated by numeral 10 and formed on a TFT substrate in an LCD device according to a first embodiment of the present invention. The TFT 10 includes a drain electrode 12, a source electrode 13, a gate electrode 11 and a channel (channel region) 14, which are somewhat different from those shown in FIG. 16. It is to be noted that the TFT 10 has a sectional structure similar to that of the TFT shown in FIG. 15.

Figure 14:
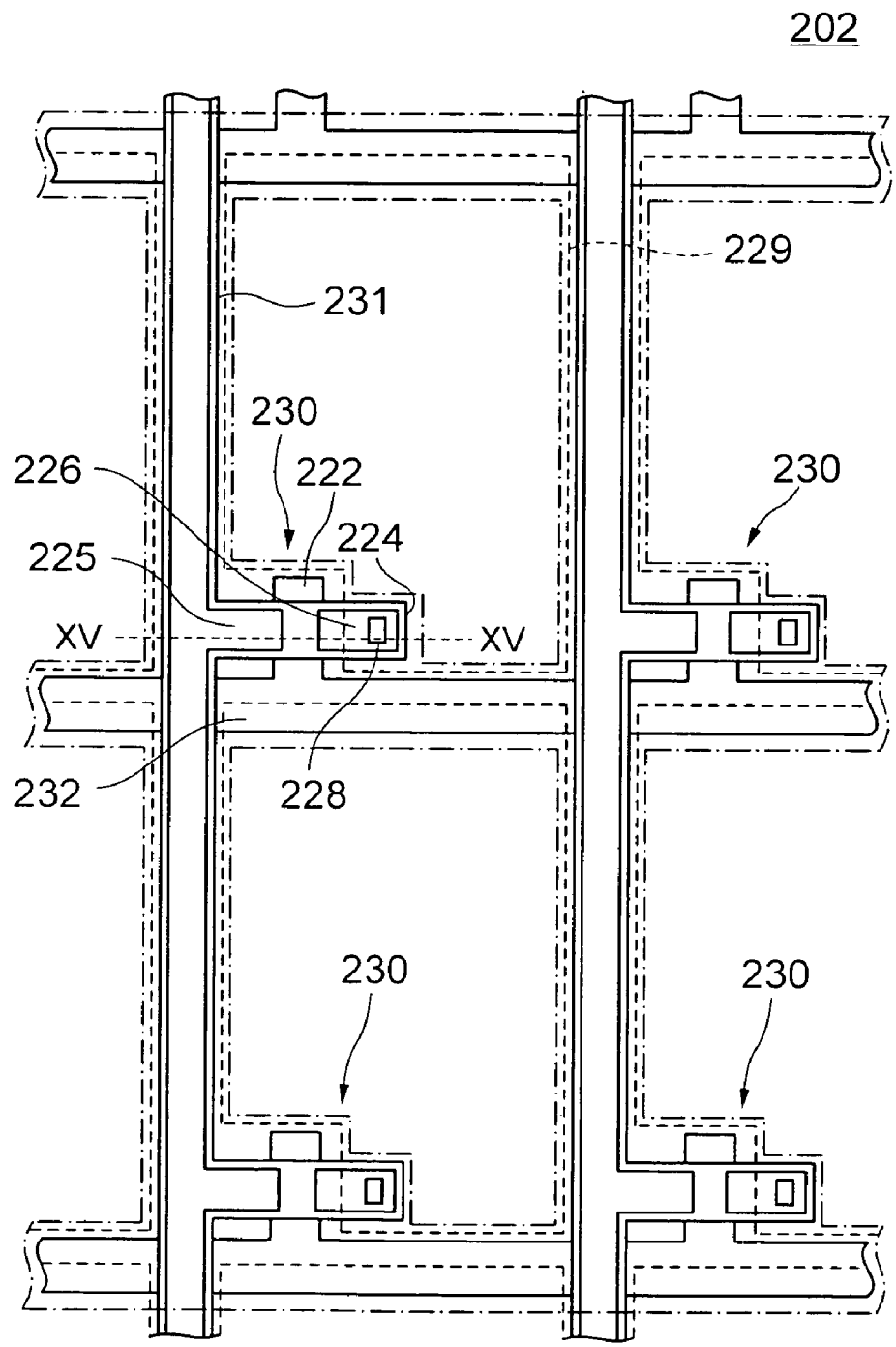
FIG. 14 is a top plan view of a portion of the TFT panel shown in FIG. 13.
Figure 15:
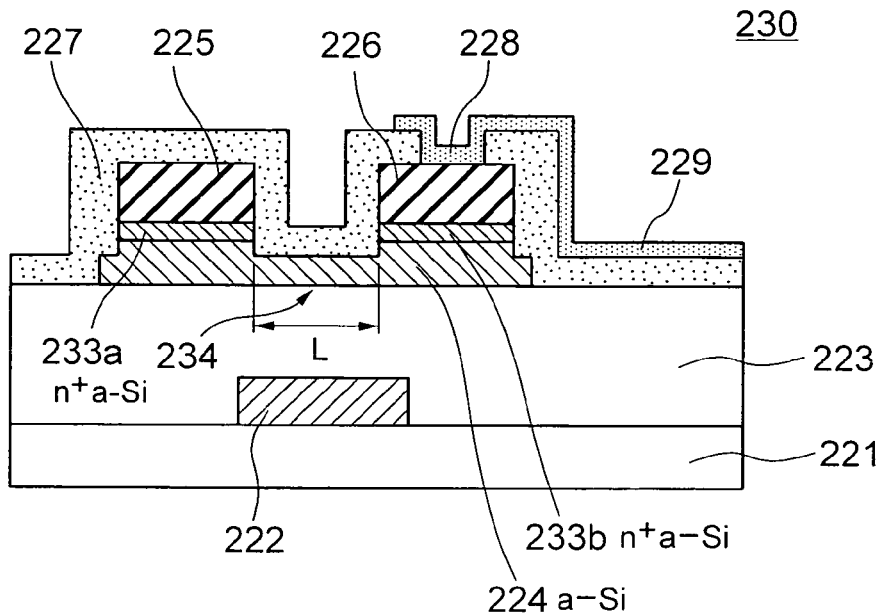
FIG. 15 is a sectional view taken along line XV-XV in FIG. 14.
Figure 16:
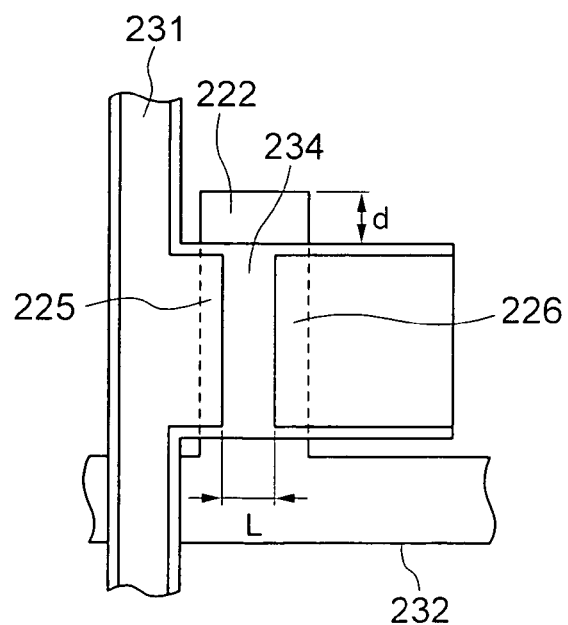
FIG. 16 is an enlarged top plan view of the TFT shown in FIG. 14.
Figure 17:
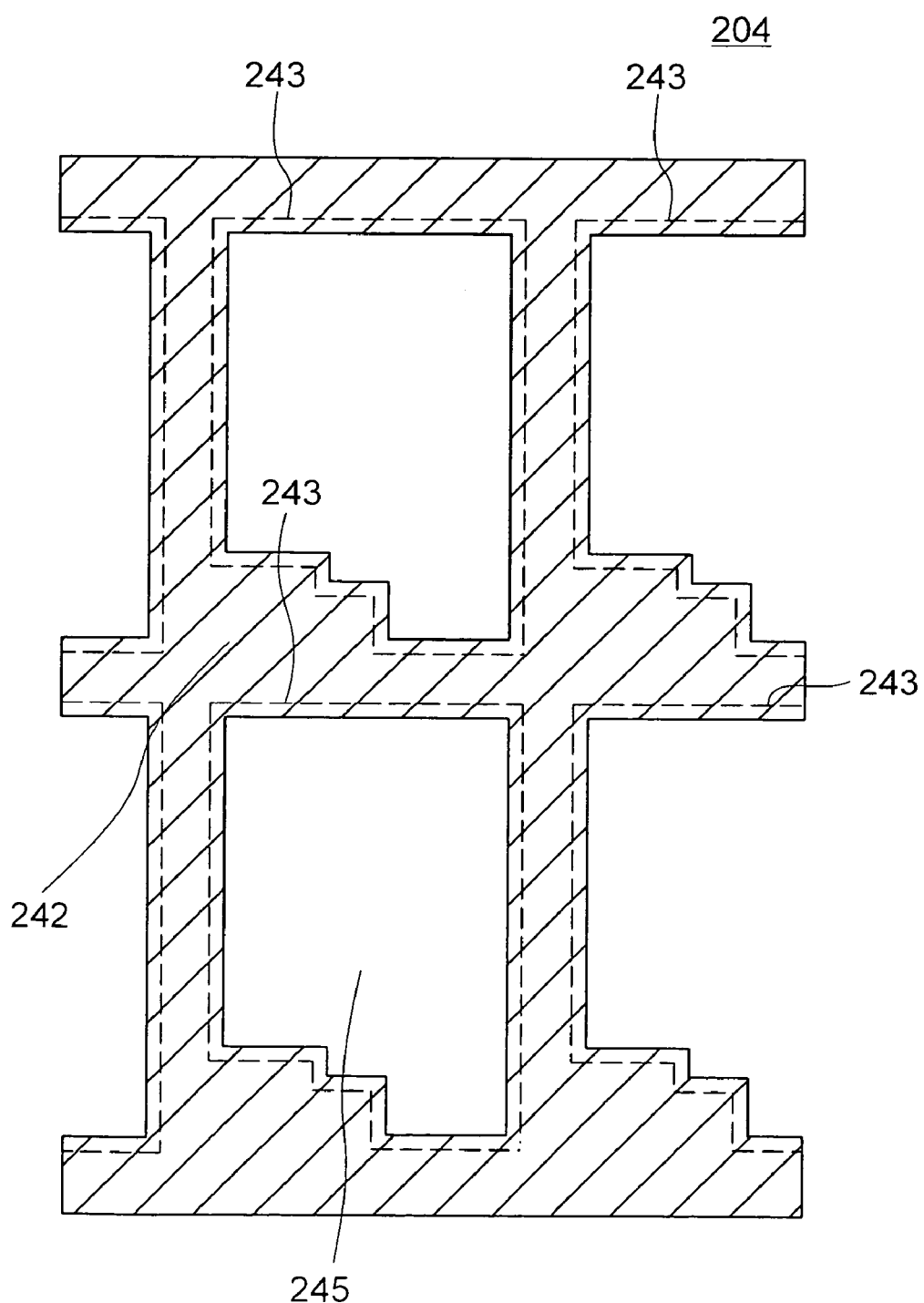
FIG. 17 is a top plan view of a portion of the counter substrate shown in FIG. 13.

The structure shown in FIG. 15 corresponds to the structure taken along line XV-XV in FIG. 1. The TFT 10 shown in FIG. 1 is disposed in the vicinity of the intersection between a signal line and a scanning line, such as 231 and 232 shown in FIG. 14. The LCD device of the present embodiment has structures other than the structure of the TFT which are similar to those shown in FIGS. 13, 14 15 and 17, and the detail description of the structures other than the TFT will be omitted herein for avoiding a duplication.

In FIG. 1, the drain electrode 12 and the source electrode 13 oppose each other, with an intervention of the channel region 14 disposed therebetween in an a-Si layer, which underlie the drain electrode 12 and the source electrode 13. Each of the drain electrode 12 and the source electrode 13 has a chamfer at both the front corners of the each of the drain electrode 12 and the source electrode 13, wherein the shape removed at each chamfer is a right-angled triangle having a side of $\Delta W$ in the widthwise direction of the channel region 14 and a side of $\Delta L$ in the lengthwise direction of the channel region 14. Thus, the channel region 14 has a central portion 14b having a constant channel length L1, and edge portions each having a channel length increasing from L1 to L2 as viewed toward the edge of the channel region 14, where $L2=L1+2\times\Delta L$. The gate electrode 11 has a gate length longer than L2, as shown in FIG. 1. In the configuration wherein the channel region 14 has a larger channel length at both the edge portions 14a and 14c thereof, the leakage current caused by the light reflected from the gate electrode 11 can be reduced due to the larger channel length.

Figure 2A:
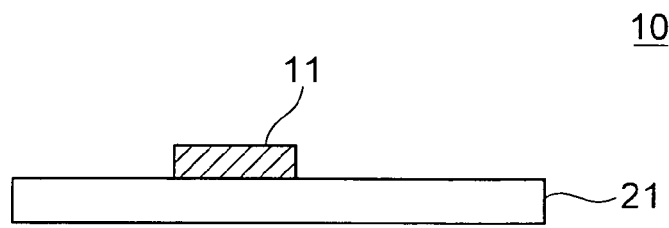
FIGS. 2A to 2G are sectional views of the TFT of FIG. 1 in consecutive steps of fabrication thereof.
Figure 2B:
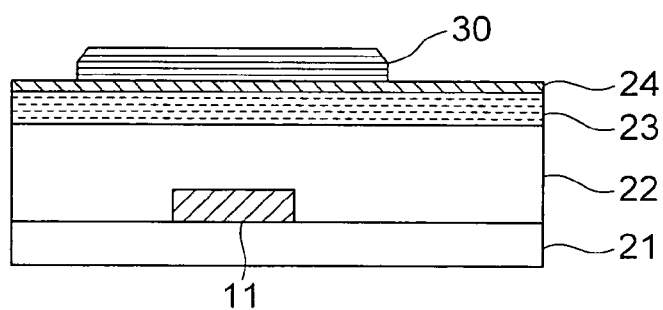
Figure 2C:
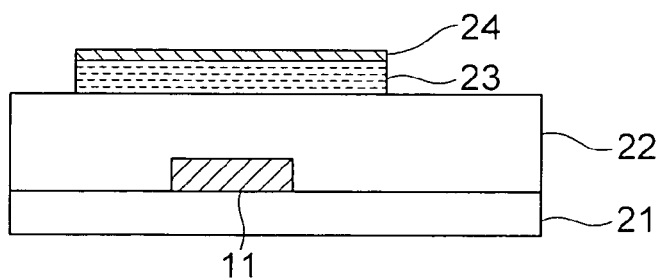
Figure 2D:
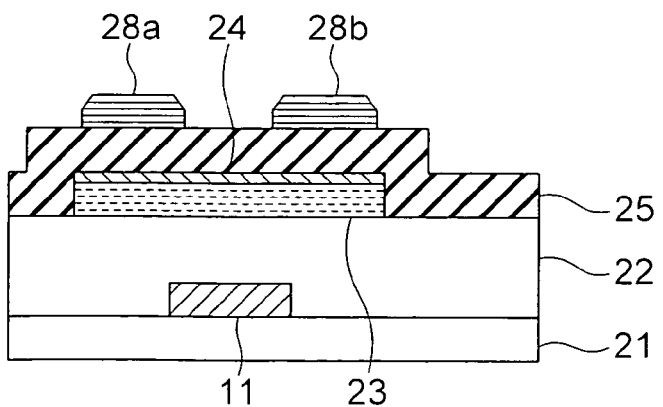

FIGS. 2A to 2G show consecutive steps in a process for manufacturing the LCD device having the TFT shown in FIG. 1. A first conductive film is deposited on a glass substrate 21, and subjected to patterning using a photoresist mask pattern to thereby obtain a gate electrode 11 having a desired pattern (FIG. 2A). A gate insulation film 22, an a-Si semiconductor layer 23 and an n$^+$-ohmic contact layer 24 are consecutively deposited on the gate electrode 11 and the glass substrate 21, followed by forming another photoresist mask pattern 30 thereon (FIG. 2B). By using the another photoresist mask pattern 30 as a mask, the ohmic contact layer 24 and semiconductor layer 23 are etched for patterning (FIG. 2C).

Figure 2E:
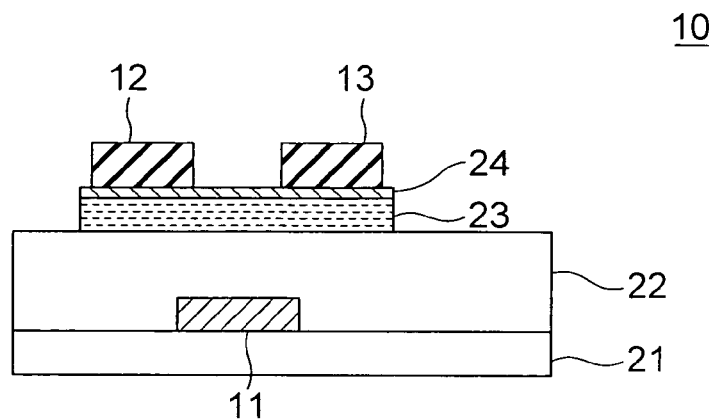

Subsequently, a second conductive film 25 is deposited, followed by forming another photoresist mask pattern 28 thereon (FIG. 2D), the photoresist mask pattern 28 including a first pattern 28a for patterning the drain electrode 12 shown in FIG. 1 and a second pattern 28b for patterning the source electrode 13 shown in FIG. 1. The structure after the patterning is shown in FIG. 2E.

Figure 2F:
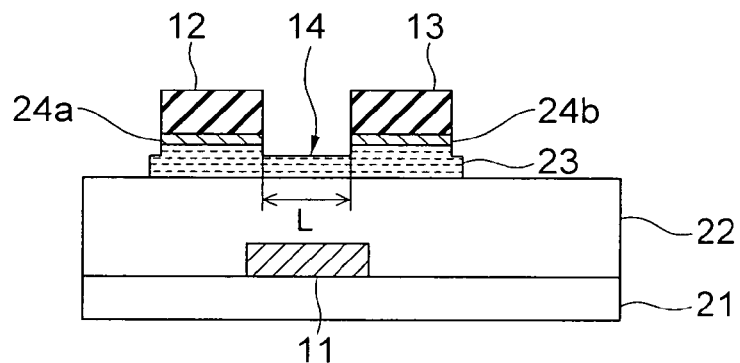
Figure 2G:
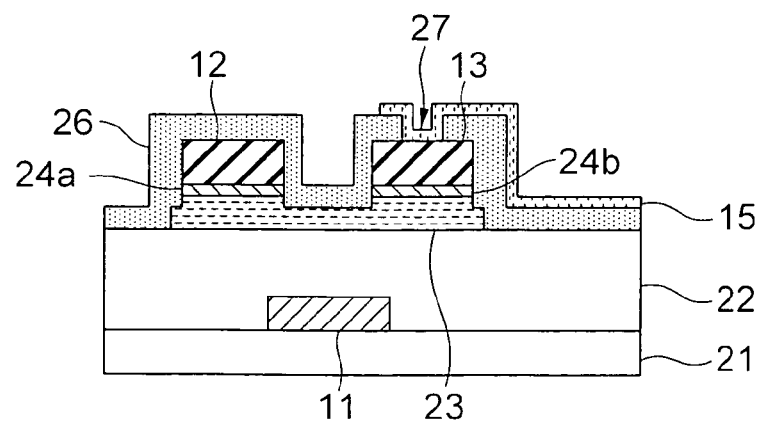

The ohmic contact layer 24 and the semiconductor layer 23 are then patterned in a channel etching process using the drain and source electrodes 12 and 13 as a mask, thereby forming the channel region 14 (FIG. 2F). The resultant channel region 14 has a length L and extends in the semiconductor layer 23 from the inner edge of the drain electrode 12 to the inner edge of the source electrode 13. Thereafter, a passivation film 26 is deposited and patterned using another photoresist mask pattern to form through-holes 27. A transparent conductive film is then formed by a coating technique and patterned using another photoresist mask pattern to form pixel electrodes 15 (FIG. 2G).

As described above, the channel region 14 has a larger channel length at the edge portions 14a and 14c thereof compared to the central portion 14b. Thus, if a larger amount of light is incident onto the edge portions of the channel, the resultant leakage current is suppressed by the larger current path of the leakage current due to the larger channel length. This suppresses degradation of the switching characteristic of the TFT caused by the leakage current. Thus, a smaller protruding length (d) of the gate electrode can be obtained without degradation of the switching characteristic of the TFT, whereby the light transmission area can be increased in the LCD device to improve the image quality thereof.

Figure 3:
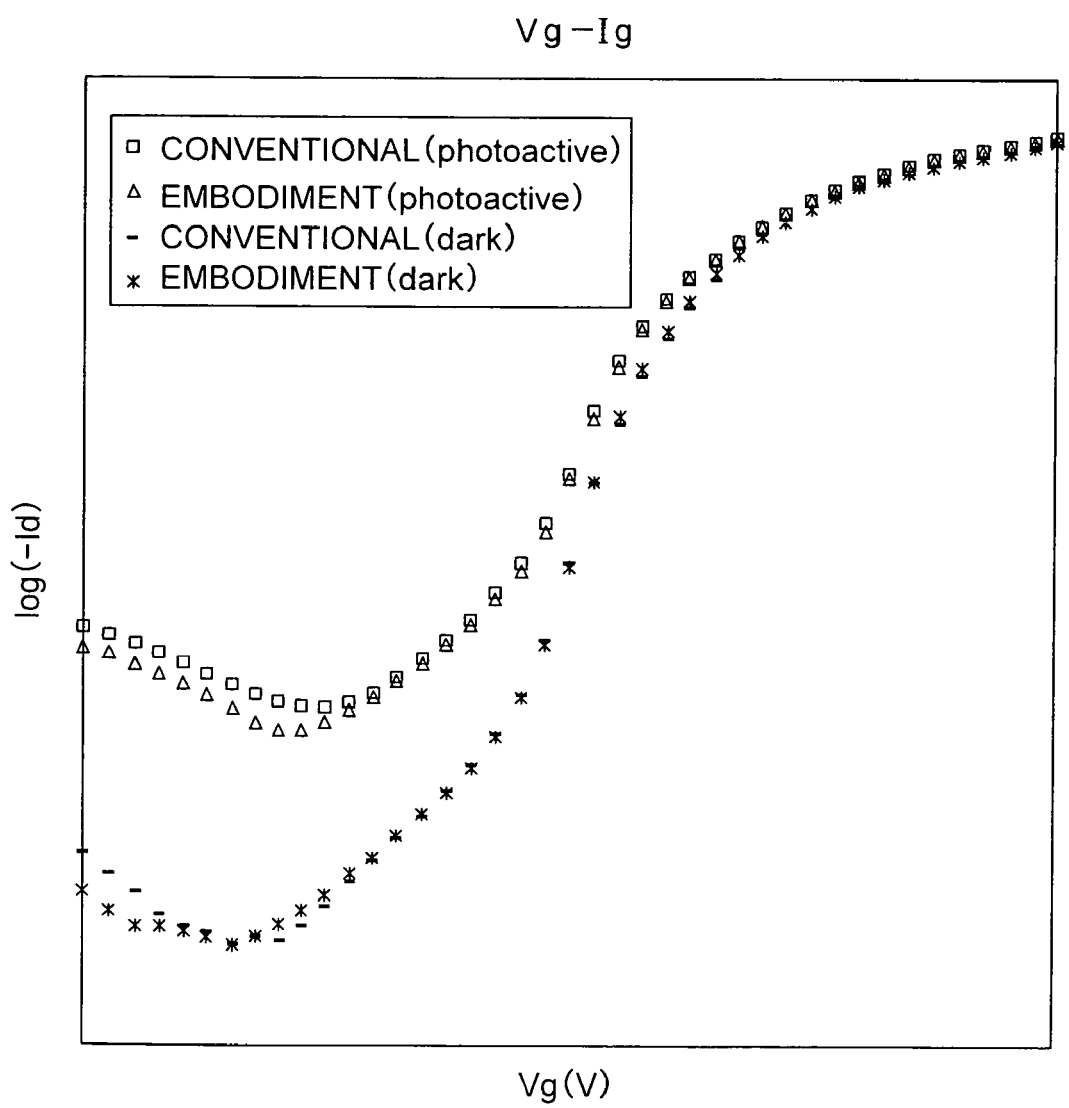
FIG. 3 is a graph showing the relationship between the gate voltage and the drain current of the TFT in the photoactive state and the dark state thereof.

FIG. 3 shows the relationship between the gate voltage (Vg volt) and the logarithm (log(-Id)) of the drain current (ampere) of the TFT 10 according to the present embodiment and the conventional TFT 230 (FIG. 18) in a photoactive state and a dark state thereof. The photoactive state corresponds to the state of the channel region irradiated by the backlight, whereas the dark state corresponds to the state of the channel region not irradiated by the backlight.

The samples of the TFTs had a channel width (W) of 24 µm, and a channel length (L1) of 6.0 µm at the central portion thereof. The chamfer of each corner of the drain and source electrodes in the TFT 10 was such that sides $\Delta W$ and $\Delta L$ were 3.0 µm and 1.2 µm, respectively, and that the average of the channel length within 3 µm apart from the channel edge, i.e., the channel length at the position 1.5 µm apart from the channel edge, was 7.2 µm, which is 120% of the channel length L1 at the central portion. In these configurations, it was assumed that the edge portions within 3 µm from the channel edges in the widthwise direction of the channel is especially susceptible to the incident light due to turn-around of the incident light.

As understood from FIG. 3, the TFT 10 of the present embodiment and the conventional TFT 230 have similar characteristics during the dark states thereof, whereas the TFT 10 of the present embodiment has a lower drain current compared to the conventional TFT 230 during the photoactive state. The minimum of the drain current during the off-state was reduced in the TFT 10 of the present embodiment by about 40% compared to the conventional TFT 230. The ON-current of the TFT 10 of the present embodiment was similar to the ON-current of the conventional TFT 230. By the measurements, it was confirmed that the larger channel length at the edge portions of the channel advantageously reduces the leakage current of the TFT, while maintaining a similar ON-current compared to the conventional TFT.

In general, the drain current will increase in proportion to the ratio of the channel width to the channel length (W/L) of the TFT. Thus, the larger channel length at the edge portions in the present embodiment may decrease the ON-current of the TFT, which is undesirable. In such a case, the design channel length L1 at the central portion should be reduced in the present embodiment for achieving a desired ON-current of the TFT.

Figure 4:
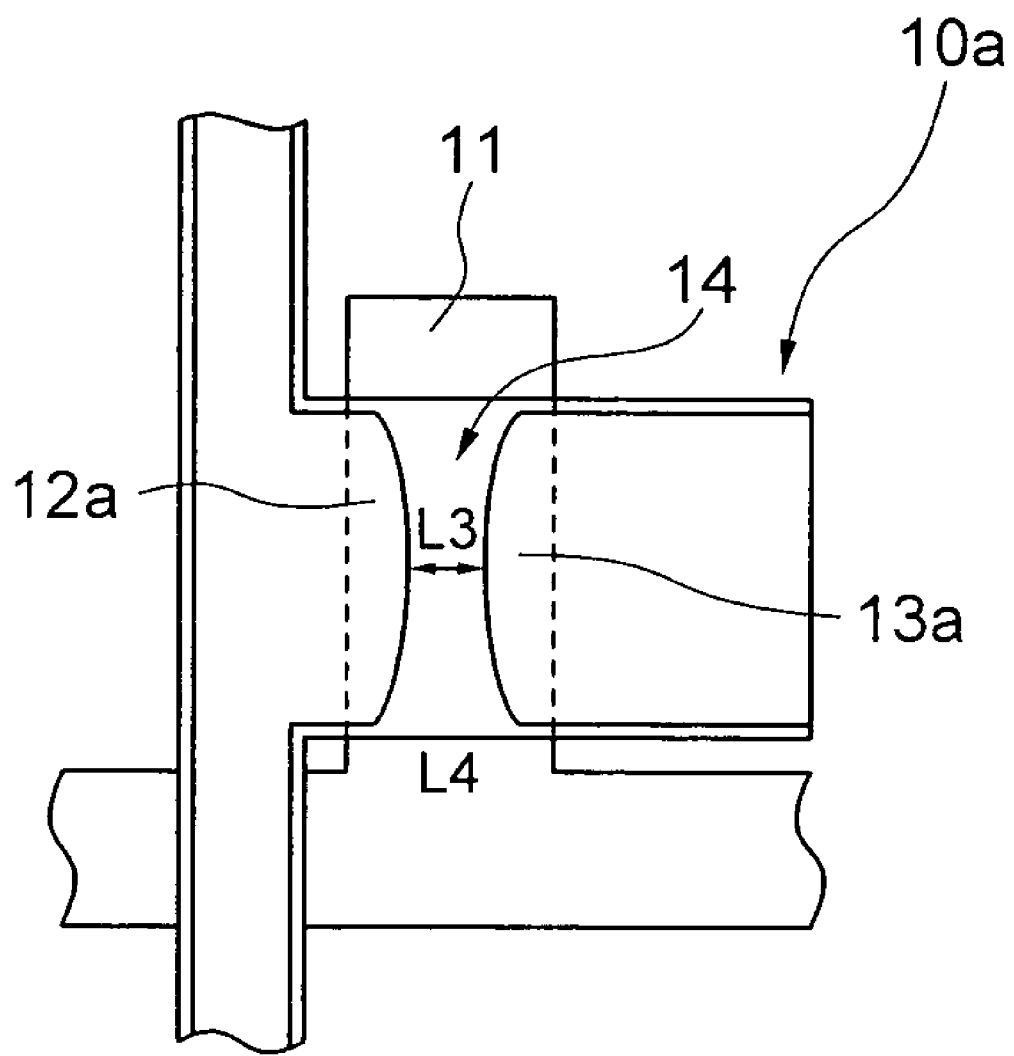
FIG. 4 is a top plan view of a TFT on a TFT substrate in an LCD device according to a second embodiment of the present invention.

FIG. 4 shows a TFT in an LCD device according to a second embodiment of the present invention. In this embodiment, the channel length of the TFT 10a is minimum (L3) at the center of the channel 14, and increases toward each of the edges thereof with a curve to assume a maximum (L4) at the each of the edges. The other configurations of the TFT in the present embodiment are similar to those in the first embodiment.

Figure 5A:
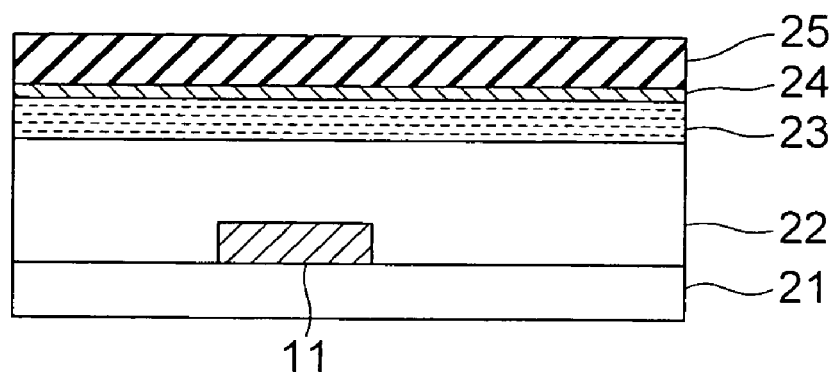
FIGS. 5A to 5E are sectional views of the TFT of FIG. 4 in consecutive steps of fabrication thereof.
Figure 5B:
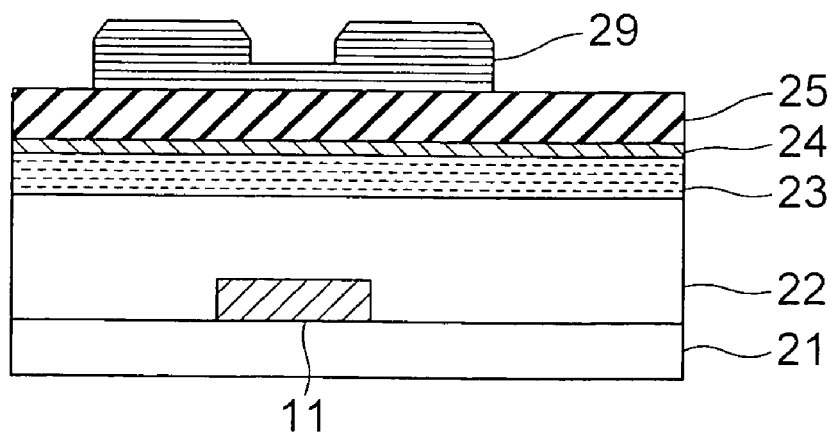

FIGS. 5A to 5E show consecutive steps of a process for fabricating the TFT of FIG. 4. A gate electrode 11 is formed on a glass substrate 21 from a first conductive film, followed by depositing thereon a gate insulation film 22, an a-Si semiconductor layer 23, an n+-Si ohmic contact layer 24 and a second conductive film 25, as shown in FIG. 5A. A photoresist mask pattern 29 is then formed on the second conductive film 25, as shown in FIG. 5B.

Figure 6A:
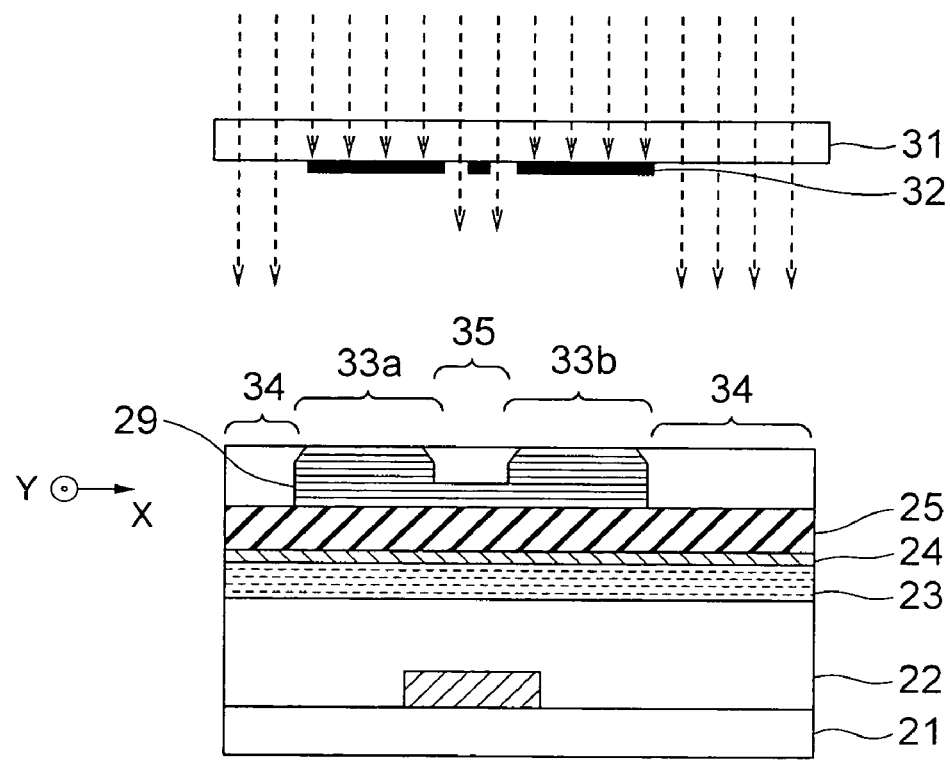
FIG. 6A is a sectional view of the fabrication step for forming the photoresist mask pattern shown in FIG. 5B.
Figure 6B:
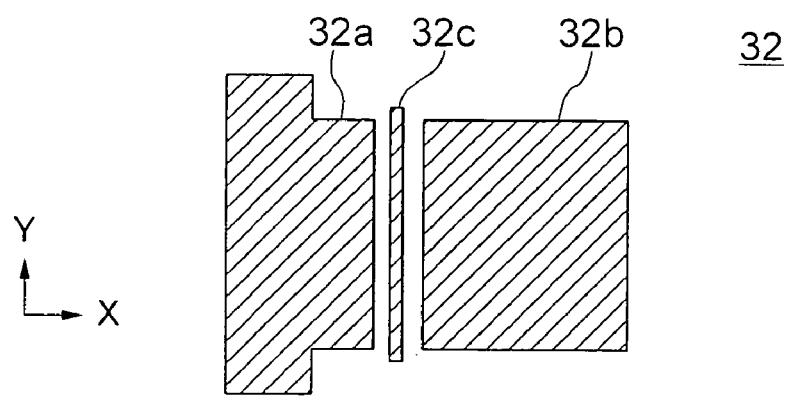
FIG. 6B is a top plan view of the mask pattern in the photomask used in the step of FIG. 6A.

FIG. 6A shows the step of patterning the photoresist mask 29, and FIG. 6B shows the configuration of the mask pattern 32 formed on the photomask 31 shown in FIG. 6A.

The mask pattern shown in FIG. 6B and used for forming the photoresist mask pattern 29 in the step of FIG. 6A has a first pattern 32a for the drain electrode, a second pattern 32b for the source electrode, and a third pattern (slit pattern) 32c sandwiched between the first pattern 32a and the second pattern 32b and disposed apart therefrom. The width of the slit pattern 32c is smaller than the limit of the resolution of the exposure by the exposure light having a specific wavelength. More specifically, the width of the slit pattern 32 is determined depending on the property of the photoresist material, the wavelength of the exposure light, and the limit of the resolution by the exposure light determined by the optical system of the exposure light such as the numerical aperture of the lens.

When an exposure light having a specific wavelength is incident onto the resist film on the second conductive film 25 through the photomask 31 in the step of FIG. 6A, part of the exposure light is blocked by the photomask pattern 32 shown in FIG. 6B. In the exposure, since the slit pattern 32c on the photomask 32 has a width smaller than the limit of the resolution by the exposure light, the incident light which may be blocked by the slit pattern 32c partly passes through the photomask 32. This results in unexposed portions 33 (33a and 33b), a half- or semi-exposed portion 35 and an unexposed portion 34 for the photoresist film, as shown in FIG. 6A.

Development is performed after the exposure of the photoresist film, whereby the exposed portion 34 of the photoresist film is removed to expose a portion of the second conductive film 25, the unexposed portions 33 are left in the photoresist mask pattern to cover another portion of the second conductive film 25, and the top portion of the half-exposed portion 35 is removed to leave the bottom portion thereof, which covers another portion of the second conductive film 25 with a smaller thickness. In other words, the photoresist mask pattern 29 has a step difference between the unexposed portion 33 and the half-exposed portion 35, as shown in FIG. 6A.

Figure 7A:
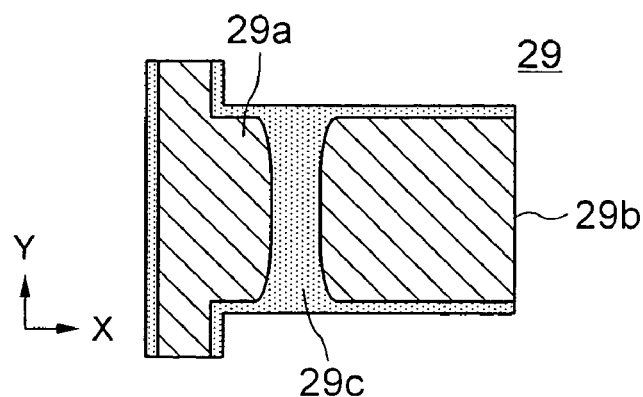
FIG. 7A is a top plan view of the photoresist mask pattern obtained by the mask pattern of FIG. 6B.

The development provides, as shown in FIG. 7A, the photoresist film with a pattern including a half-exposed portion 29c, an unexposed portion 29 (29a and 29b), and an exposed (removed) portion. In addition, the half-exposed portion 29c, as understood from FIG. 7A, has a larger length at both the edges of the channel compared to the central portion thereof, because the edge portions are additionally exposed by the turned-around light entering the edge portions from the vicinities of both the edges in the widthwise direction of the channel. The photoresist mask pattern 29 also includes a half-exposed portion 29c on the periphery of the unexposed portions 29a and 29b due to the turned-around light.

The slit pattern 32c, as shown in FIG. 6B, protrudes from the edges of patterns 32a and 32b for the source/drain electrodes. The protrusions of the slit pattern 32c allows a larger amount of light to enter the channel area around the slit pattern 32c compared to the central portion of the channel, thereby forming a larger channel length at the edge portions of the channel, as shown in FIG. 7A, and providing curved edges of the first and second patterns 29a and 29b.

Figure 5C:
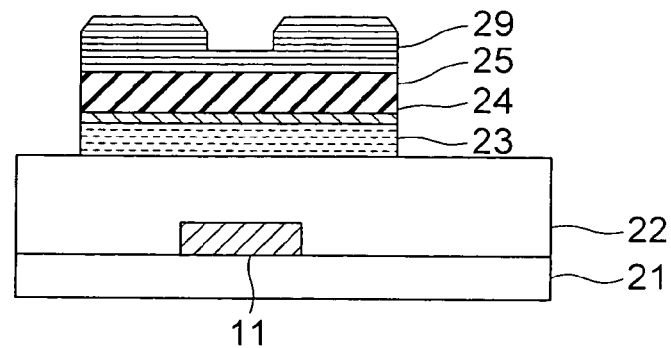
Figure 5D:
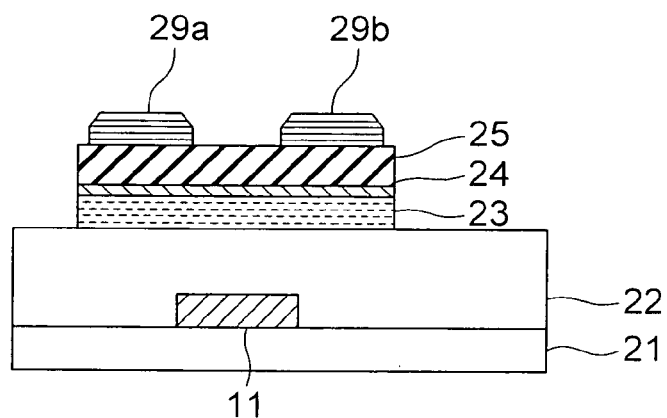

The resultant photoresist mask pattern 29, shown in FIG. 7A, is used for etching the second conductive film 25, ohmic contact layer 24 and semiconductor layer 23 (FIG. 5C). The photoresist mask pattern 29 shown in FIG. 7A is then subjected to an ashing treatment for reducing the overall thickness of the photoresist mask pattern 29 to thereby remove the half-exposed portion 29c and obtain the photoresist mask pattern shown in FIG. 7B (FIG. 5D).

The ashing treatment may be performed using a reactive-ion-etching system or a UV ashing system. The former is superior in the etch anisotropy to achieve a higher controllability in the dimensions of the photoresist mask pattern, whereas the latter is superior in terms of a simple process.

Figure 5E:
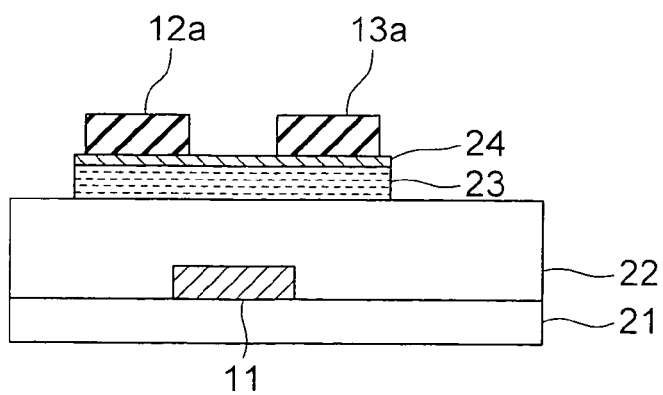
Figure 7B:
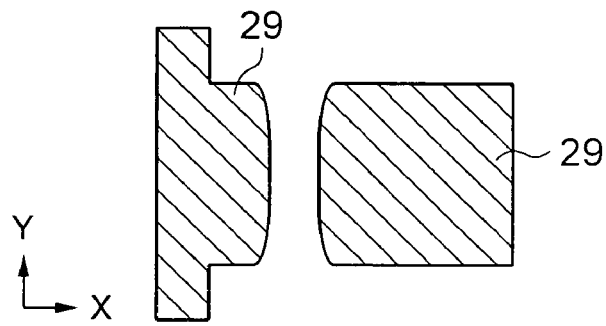
FIG. 7B is a top plan view of the photoresist mask pattern of FIG. 7A after removal of the half-exposed portion therefrom.

The photoresist mask pattern 29 shown in FIG. 7B, as obtained after the ashing treatment, is used for further patterning the second conductive film 25 to configure the drain electrode 12a and the source electrode 13a and determine the channel length between the drain electrode 12a and the source electrode 13a (FIG. 5E). Thereafter, similarly to the first embodiment, part of the ohmic contact layer 24 and semiconductor layer 23 is subjected to a channel etching treatment, followed by forming a passivation film 26, contact hole 27 and pixel electrodes 15, such as shown in FIG. 2G, to achieve the TFT 10a.

In the present embodiment, as understood from FIG. 4, the channel region 14 defined by the curved opposing edges of the drain electrode 12a and the source electrode 13a has a larger channel length L4 at both the edge portions of the channel compared to the channel length L3 at the central portion thereof. In this structure either, the resultant TFT exhibits a lower leakage current caused by the incident light especially onto the edge portions of the channel 14 to thereby improve the image quality of the LCD device.

In an alternative of the process for forming the TFT 10a as described above, the TFT 10a may be formed by a process similar to the process shown in FIGS. 2A to 2G. In this case, the photoresist mask pattern may be patterned to have the shape of the electrodes 12a and 13a shown in FIG. 4. It is to be noted that the process shown in FIGS. 2A to 2G requires two photolithographic steps for patterning the photoresist mask pattern 30 and the photoresist mask pattern 28. The method of the present embodiment shown in FIGS. 5A to 5E requires only a single photolithographic step, thereby reducing the fabrication steps and costs for the LCD device.

Figure 8:
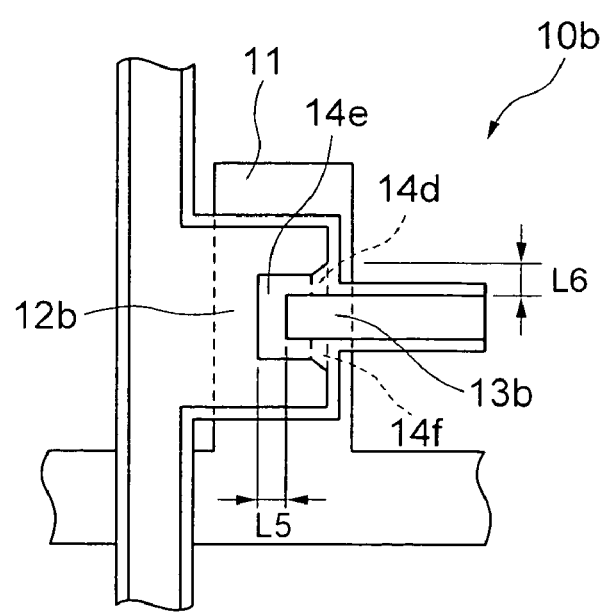
FIG. 8 is a top plan view of a TFT on a TFT substrate in an LCD device according to a third embodiment of the present invention.

FIG. 8 shows a TFT in an LCD device according to a third embodiment of the present invention. The TFT 10b in the present embodiment is similar to the TFT 10 of the first embodiment except for the configuration of the source and drain electrodes 13b and 12b. More specifically, the drain electrode 12b has a U-shaped front edge having a cut-out therein, into which the front edge of the source electrode 13b protrudes. Each leg of the U-shaped front edge has a chamfer to achieve a larger channel length L6 at both the edges of the channel 14 compared to the channel length L5 at the central portion 14e, similarly to the cases of the first and second embodiments.

Although the drain electrode 12b and the source electrode 13b have an asymmetry structure therebetween, the leakage current caused by the incident light is reduced especially in the edge portions 14d of the channel 14 by the larger channel length L6 at both the edge portions 14d.

The above embodiments are described with reference to the example of an inverted-staggered structure; however, the structure of the TFT in the present invention is not limited to the inverted-staggered structure, may be of a non-inverted staggered structure, and is not limited to the staggered structure itself. If the non-inverted staggered structure is used in the TFT, the incident light may be blocked by another shield film underlying the semiconductor layer.

Moreover, although the channel region between the drain electrode and the source electrode in the above embodiments has a symmetric structure with respect to the center of the channel, the distance itself need not be in symmetry. For example, if the light enters the channel region in a larger amount at the edge of the channel near the pixel electrode compared to the edge of the channel near the scanning line, the channel length should be larger at the edge portion of the channel near the pixel electrode. The structure and the shape of the source electrode etc. used herein are only examples, and may be modified as desired.

Figure 9:
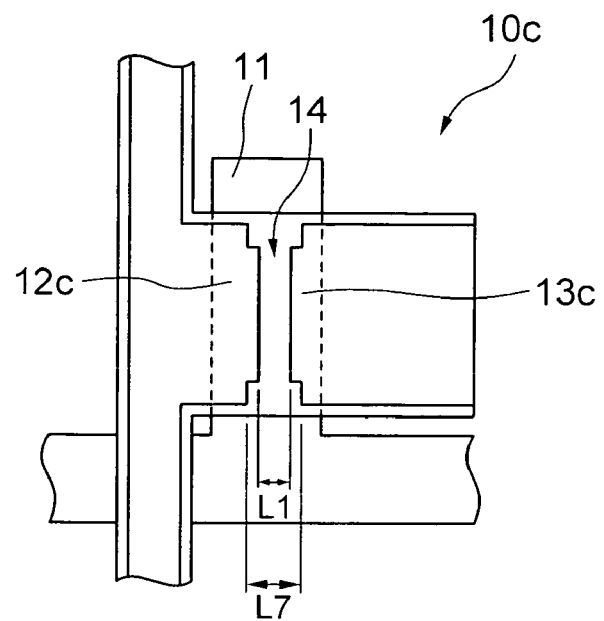
FIG. 9 is a top plan view of another example of the TFT in an LCD device of the present invention.
Figure 10:
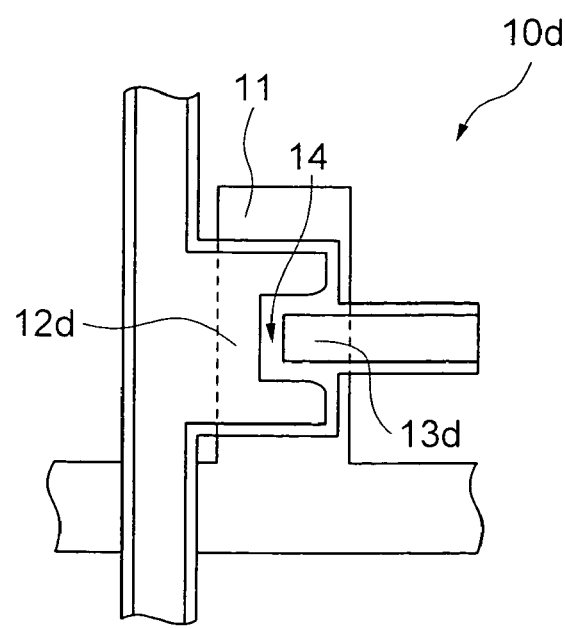
FIG. 10 is a top plan view of another example of the TFT in an LCD device of the present invention.
Figure 11:
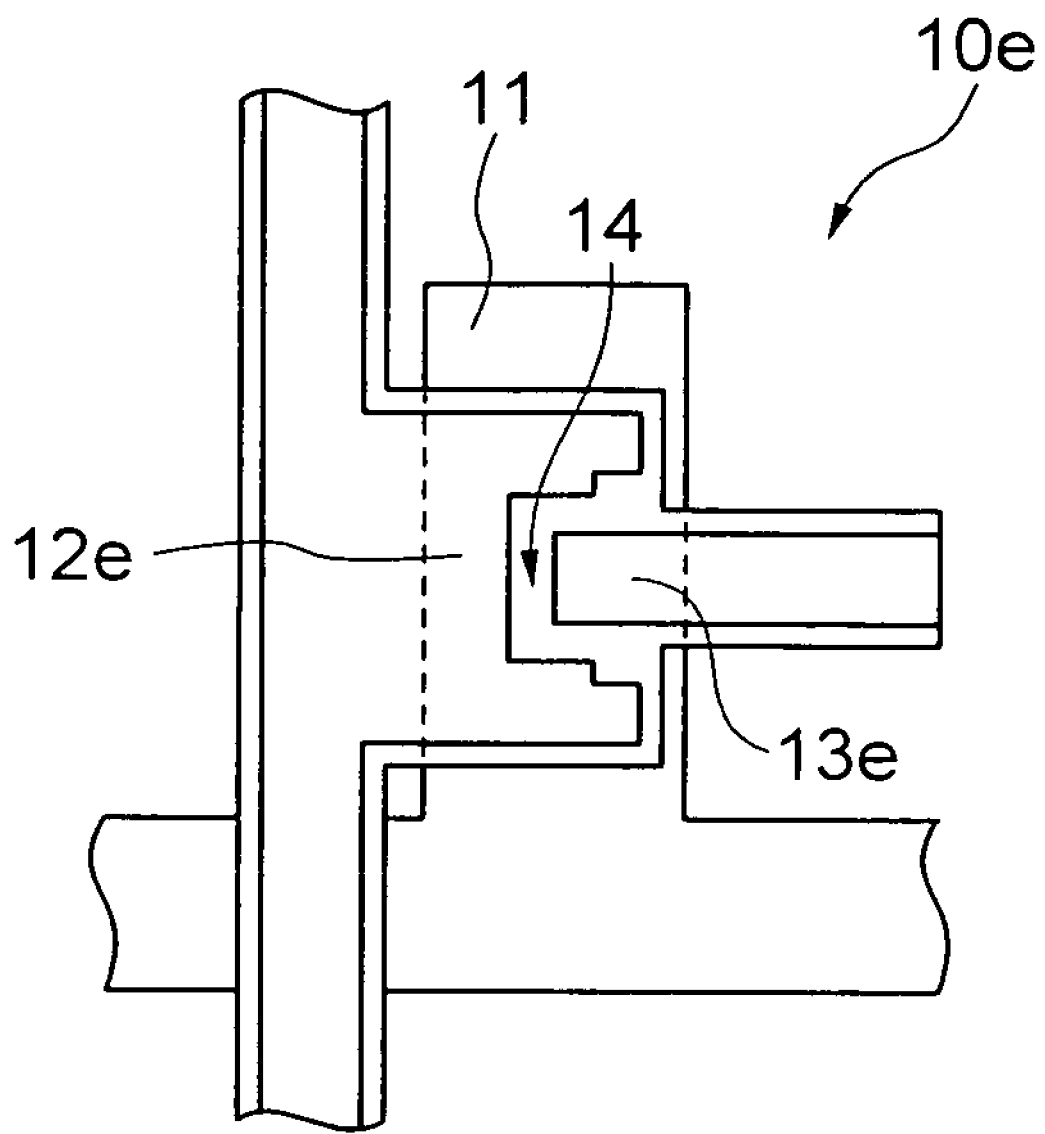
FIG. 11 is a top plan view of another example of the TFT in an LCD device of the present invention.

FIGS. 9 to 11 show other examples of the TFT wherein the channel region 14 has a larger length at both the edges of the channel region 14 compared to the central portion thereof. In FIG. 9, each electrode has a front corner having a cut-out portion of a rectangular shape instead of the chamfer in the first embodiment. In the structure of FIG. 9, the channel length L7 at the edge portions may be equal to the average channel length at the edge portions of the channel in the first embodiment.

FIG. 10 shows a TFT which is an alternative of the TFT shown in FIG. 8. In FIG. 10, the leg of the U-shaped front edge of the drain electrode 12d has a round corner opposing the protruding edge of the source electrode 13d to achieve a larger channel length, instead of the chamfer in FIG. 10. FIG. 11 shows a TFT modified from the TFT of FIG. 10. In this modification, the leg of the U-shaped front edge has a stepped corner to achieve a larger channel length at the edge portions of the channel.

Figure 12A:
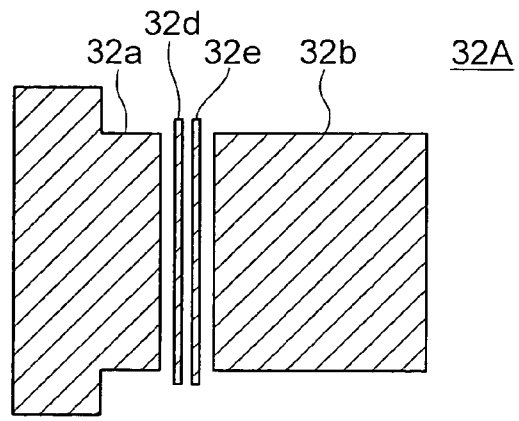
FIGS. 12A to 12C are top plan views of other examples of the mask pattern in the photomask used in the step of FIG. 6A.
Figure 12B:
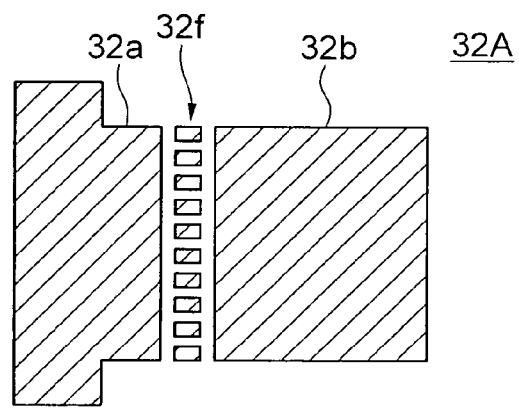
Figure 12C:
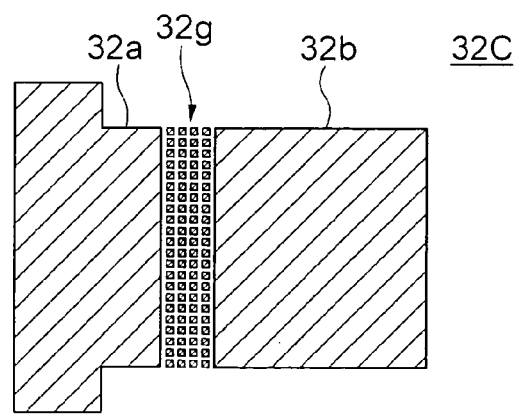
Figure 13:
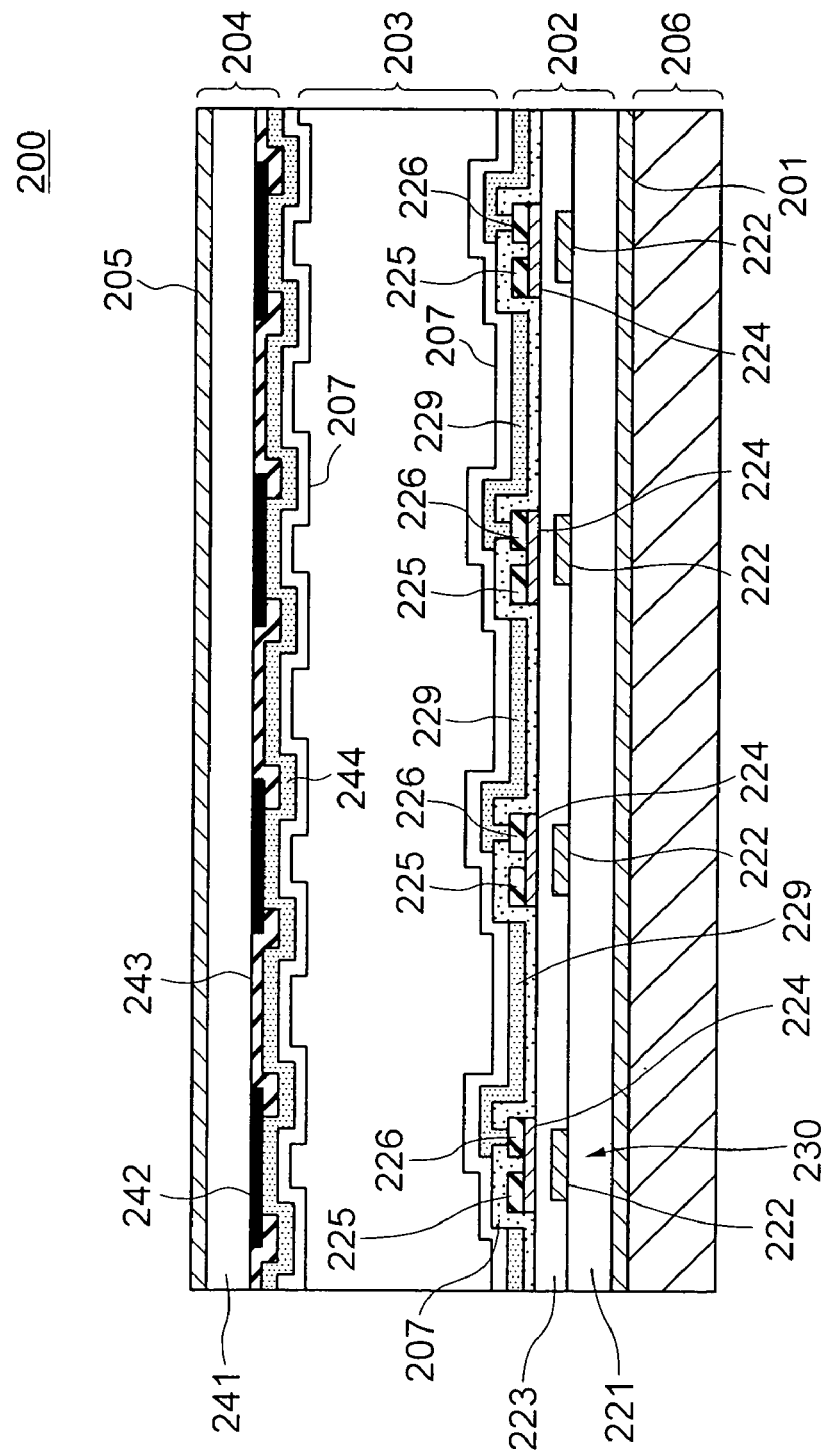
FIG. 13 is a sectional view of a general LCD device.

FIGS. 12A to 12C show alternatives of the slit pattern 32c of the photomask 32 used for forming the TFT in the step shown in FIG. 6A.

The photomask 32A shown in FIG. 12A includes a pair of juxtaposed slit patterns 32d and 32e between the first pattern 32a for the drain electrode and the second pattern 32b for the source electrode. Each slit pattern 32d or 32e has a width smaller than the limit of the resolution by the exposure light. The pair of slit patterns 32d and 32e may be preferably used in the case where the TFT has a larger channel length or in the case where the exposure light has a higher resolution capability.

The photomask 32B shown in FIG. 12B has a multiple of stripe patterns arranged in the widthwise direction of the channel to form a pattern assembly (slit pattern) 32f between the first pattern 32a and the second pattern 32b. Each of the stripe patterns has a length, as viewed in the lengthwise direction of the channel, smaller than the limit of the resolution by the exposure light. The pattern assembly 32f shown in FIG. 12B can suppress the influence by a degree of variation in the shape of the photoresist mask pattern along the scanning direction of the exposure light and the development direction of the photoresist mask pattern.

The photomask 32C shown in FIG. 12C has a multiple of dot patterns arranged in an array as a pattern assembly (slit pattern) 32g between the first pattern 32a and the second pattern 32b. Each of the dot patterns has a length, as viewed in the lengthwise direction of the channel, smaller than the limit of the resolution by the exposure light. The pattern assembly 32C can improve the uniformity in the thickness of the photoresist mask pattern between the first pattern for the drain electrode and the second pattern for the source electrode.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) device comprising a TFT (thin-film-transistor) substrate mounting thereon a plurality of TFTs each having a channel in an ohmic contact layer and a semiconductor layer;
   a counter substrate mounting thereon a black matrix;
   a liquid crystal layer sandwiched between said TFT substrate and said counter substrate;
   a backlight unit disposed at a rear side of said TFT substrate for irradiating said TFT substrate with backlight, said counter substrate mounting thereon a light shield overlapping said channel of said TFTs as view normal to said counter substrate; and
   a rear shield film interposed between said channel of said TFTs and said backlight unit to overlap said channel of said TFTs s viewed normal to said TFT substrate,
   said channel having a channel length larger at an edge portion of said channel adjacent to one of said pixels than at a central portion thereof, whereupon leakage current of said TFT at said edge portion is suppressed.

2. The LCD device according to claim 1, wherein said channel length is larger at both edge portions of said channel than at said central portion thereof.

3. The LCD device according to claim 1, wherein said TFT includes a gate electrode disposed between said channel and said backlight unit; said gate electrode having a function of shielding said channel against said backlight.

4. The LCD device according to claim 1, wherein said semiconductor layer is made of an amorphous silicon film or a polysilicon film.

5. The LCD device according to claim 1, wherein said TFT includes source and drain electrodes opposing said gate electrode with an intervention of said semiconductor layer.

6. The LCD device according to claim 1, wherein said ohmic contact layer is between said semiconductor layer and said source and drain electrodes.

7. The LCD device according to claim 1, wherein said source and drain electrodes of said TFT overlie said semiconductor layer.

8. The LCD device according to claim 1, wherein said channel length monotonically decreases from said edge portions to said central portion.

9. A liquid crystal display (LCD) device comprising a TFT (thin-film-transistor) substrate mounting thereon a plurality of TFTs, a counter substrate mounting thereon a black matrix, a liquid crystal layer sandwiched between said TFT substrate and said counter substrate for defining an array of pixels, and a backlight unit disposed at a rear side of said TFT substrate for irradiating said TFT substrate with backlight, each of said TFTs having a channel in an ohmic contact layer and a semiconductor layer, said channel being aligned, as viewed normal to said substrates, with said black matrix and a light shield layer disposed between said channel and said backlight unit, said channel having a channel length larger at an edge portion of said channel adjacent to one of said pixels than at a central portion thereof.

10. The LCD device according to claim 9, wherein said light shield layer is a gate electrode of said TFT.

11. The LCD device according to claim 9, wherein said TFTs each have source and drain regions having edges asymmetric to each other with respect to said channel.

12. The LCD device according to claim 9, wherein said channel has a curved portion wherein said channel length monotonically increases from said central portion to both said edge portions.

13. A liquid crystal display (LCD) device comprising a thin-film-transistor (TFT) substrate mounting thereon a plurality of TFTs, a counter substrate mounting thereon a black matrix, a liquid crystal layer sandwiched between said TFT substrate and said counter substrate for defining an array of pixels, each of said pixels including one of said TFTs and an associated pixel electrode, and a backlight unit disposed at a rear side of said TFT substrate for irradiating said TFT substrate with backlight, each of said TFTs having a channel in an ohmic contact layer and a semiconductor layer, said channel being aligned, as viewed normal to said substrates, with said black matrix and a light shield layer disposed between said channel and said backlight unit, said channel having a channel length larger at both edge portions of said channel than at a central portion thereof.

14. The LCD device according to claim 13, wherein said channel has a curved portion wherein said channel length monotonically increases from said central portion to both said edge portions.

15. A liquid crystal display (LCD) device comprising a TFT (thin-film-transistor) substrate mounting thereon a plurality of TFTs, a counter substrate mounting thereon a black matrix, a liquid crystal layer sandwiched between said TFT substrate and said counter substrate for defining an array of pixels, and a backlight unit disposed at a rear side of said TFT substrate for irradiating said TFT substrate with backlight, each of said TFTs having a channel in an ohmic contact layer and a semiconductor layer, said channel being aligned, as viewed normal to said substrates, with said black matrix and a light shield layer disposed between said channel and said backlight unit, said channel having a channel length larger at an edge portion of said channel adjacent to one of said pixels than at a central portion thereof, wherein said edge of said channel has a stepwise portion wherein said channel length increases toward said edge portion.

16. A liquid crystal display (LCD) device comprising a thin-film-transistor (TFT) substrate mounting thereon a plurality of TFTs, a counter substrate mounting thereon a black matrix, a liquid crystal layer sandwiched between said TFT substrate and said counter substrate for defining an array of pixels, each of said pixels including one of said TFTs and an associated pixel electrode, and a backlight unit disposed at a rear side of said TFT substrate for irradiating said TFT substrate with backlight, each of said TFTs having a channel in an ohmic contact layer and a semiconductor layer, said channel being aligned, as viewed normal to said substrates, with said black matrix and a light shield layer disposed between said channel and said backlight unit, said channel having a channel length larger at both edge portions of said channel than at a central portion thereof, wherein said edge portions of said channel have stepwise portions wherein said channel length increases toward said edge portion.

17. The LCD device according to claim 16, wherein said light shield layer is a gate electrode of said TFT.

18. The LCD device according to claim 16, wherein said TFTs each have source and drain regions having edges asymmetric to each other with respect to said channel.

19. The LCD device according to claim 16, wherein the source and drain, regions have chamfered corners.

20. A liquid crystal display (LCD) device comprising a TFT (thin-film-transistor) substrate mounting thereon a plurality of TFTs each having a channel in an ohmic contact layer and a semiconductor layer;

a counter substrate mounting thereon a black matrix;

a liquid crystal layer sandwiched between said TFT substrate and said counter substrate;

a backlight unit disposed at a rear side of said TFT substrate for irradiating said TFT substrate with backlight, said counter substrate mounting thereon a light shield overlapping said channel of said TFTs as view normal to said counter substrate; and a rear shield film interposed between said channel of said TFTs and said backlight unit to overlap said channel of said TFTs s viewed normal to said TFT substrate, said channel having a channel length lager at an edge portion of said channel adjacent to one of said pixels than at a central portion thereof, whereupon leakage current of said TFT at said edge portion is suppressed, wherein said TFT includes source and drain electrodes opposing said gate electrode with an intervention of said semiconductor layer, and the edge portion is chamfered.

21. The LCD device according to claim 20, wherein the drain electrode and the source electrode have chamfered corners.

* * * * *